US009553543B2

(12) United States Patent
Kitano et al.

(10) Patent No.: US 9,553,543 B2
(45) Date of Patent: Jan. 24, 2017

(54) PHOTOVOLTAIC SYSTEM

(71) Applicant: KYOCERA CORPORATION, Kyoto-shi, Kyoto (JP)

(72) Inventors: Takahiro Kitano, Komatsu (JP); Kouki Uchida, Ise (JP); Yoshiyuki Fujikawa, Higashiomi (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/397,171

(22) PCT Filed: Apr. 26, 2013

(86) PCT No.: PCT/JP2013/062425
§ 371 (c)(1),
(2) Date: Oct. 24, 2014

(87) PCT Pub. No.: WO2013/162009
PCT Pub. Date: Oct. 31, 2013

(65) Prior Publication Data
US 2015/0144580 A1 May 28, 2015

(30) Foreign Application Priority Data

Apr. 26, 2012 (JP) ................. 2012-101783
Aug. 29, 2012 (JP) ................. 2012-189185
Jan. 29, 2013 (JP) ................. 2013-014693

(51) Int. Cl.
*H02N 6/00* (2006.01)
*H01L 31/042* (2014.01)
(Continued)

(52) U.S. Cl.
CPC ............... *H02S 20/00* (2013.01); *F24J 2/523* (2013.01); *F24J 2/525* (2013.01); *F24J 2/526* (2013.01);
(Continued)

(58) Field of Classification Search
CPC ......... Y02B 10/12; Y02B 10/20; Y02E 10/47; F24J 2/523; F24J 2/5264; F24J 2/526; F24J 2/5243; H01L 31/0422
(Continued)

(56) References Cited

U.S. PATENT DOCUMENTS

2011/0049322 A1    3/2011 Pham et al.
2012/0056066 A1    3/2012 Habdank et al.

FOREIGN PATENT DOCUMENTS

CN    202 058 760 U    11/2011
DE    203 19 065 U1    4/2004
(Continued)

OTHER PUBLICATIONS

International Search Report dated Jul. 2, 2013 issued in counterpart International Application No. PCT/JP2013/062425.
Written Opinion of International Searching Authority dated Jun. 19, 2013 issued in counterpart International Application No. PCT/JP2013/062425.
International Preliminary Report on Patentability dated Oct. 26, 2014 issued for International Application No. PCT/JP2013/062425.
Office Action dated Feb. 3, 2015 issued in counterpart Japanese application No. 2014-512717.
(Continued)

*Primary Examiner* — Kimberly Wood
(74) *Attorney, Agent, or Firm* — Procopio Cory Hargreaves and Savitch LLP

(57) ABSTRACT

A photovoltaic system includes a pole member which stands on an installation surface, a connecting support member disposed on an upper end section of the pole member, a rail member supported by the connecting support member, and a photovoltaic cell module disposed on the rail member, wherein the pole supporting member includes a lower section that covers at least a portion of an outer peripheral surface of the upper end section of the pole member.

10 Claims, 17 Drawing Sheets

(51) Int. Cl.
 *F24J 2/52*  (2006.01)
 *H02S 20/30* (2014.01)
 *H02S 20/10* (2014.01)
 *F24J 2/46*  (2006.01)

(52) U.S. Cl.
 CPC ............ *F24J 2/5207* (2013.01); *F24J 2/5211* (2013.01); *F24J 2/5232* (2013.01); *F24J 2/5264* (2013.01); *H02S 20/10* (2014.12); *H02S 20/30* (2014.12); *F24J 2002/4672* (2013.01); *F24J 2002/5215* (2013.01); *F24J 2002/5226* (2013.01); *Y02E 10/47* (2013.01)

(58) Field of Classification Search
 USPC .......... 248/200, 226.11, 227.4, 228.1, 227.2, 248/121, 122.2, 419, 178, 188.7, 423, 248/220.21; 52/745.2, 747.1, 173.3, 710, 52/711, 511, 489.1; 136/251, 291, 244; 403/103
 See application file for complete search history.

(56) References Cited

FOREIGN PATENT DOCUMENTS

| | | |
|---|---|---|
| DE | 20 2010 004694 U1 | 7/2010 |
| EP | 2 381 484 A1 | 10/2011 |
| JP | S53-101168 | 8/1978 |
| JP | 5-321339 A | 12/1993 |
| JP | 7-027170 U | 5/1995 |
| JP | 2007-251001 A | 9/2007 |
| JP | 2009-302123 A | 12/2009 |
| JP | 2011-256636 A | 12/2011 |
| JP | 2012-002044 A | 1/2012 |
| JP | 2012-069929 A | 4/2012 |
| JP | 2012-180668 A | 9/2012 |
| WO | 2010/124529 A1 | 11/2010 |

OTHER PUBLICATIONS

Extended European Search Report dated Jan. 4, 2016, issued in counterpart EPC Application No. 13781564.3.

F I G. 1
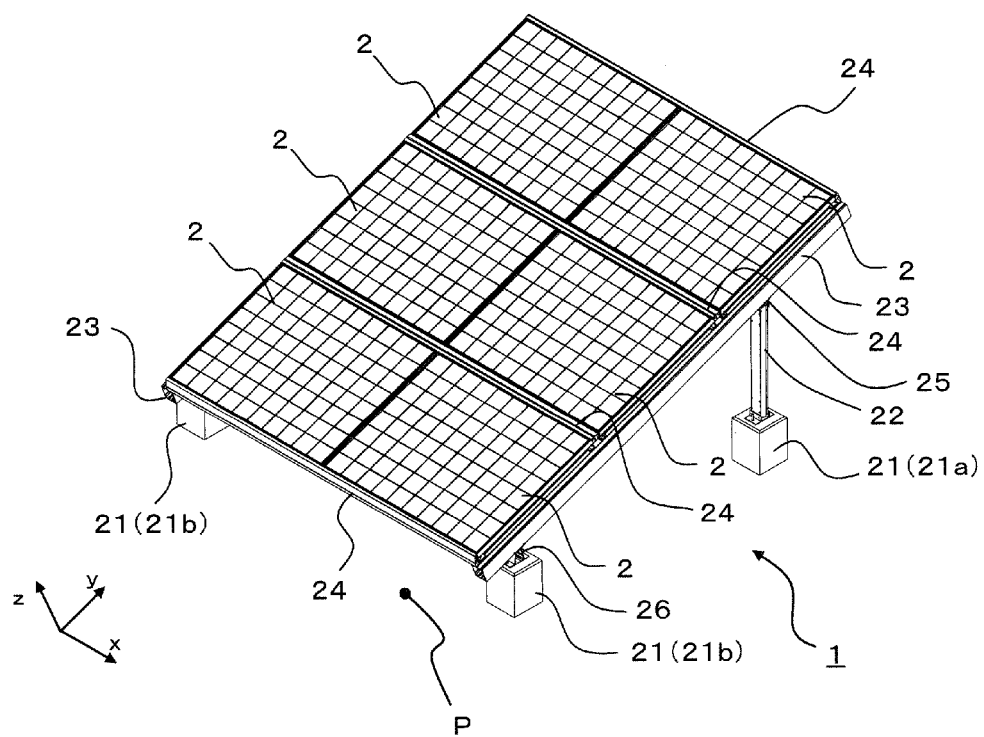

F I G. 4 B
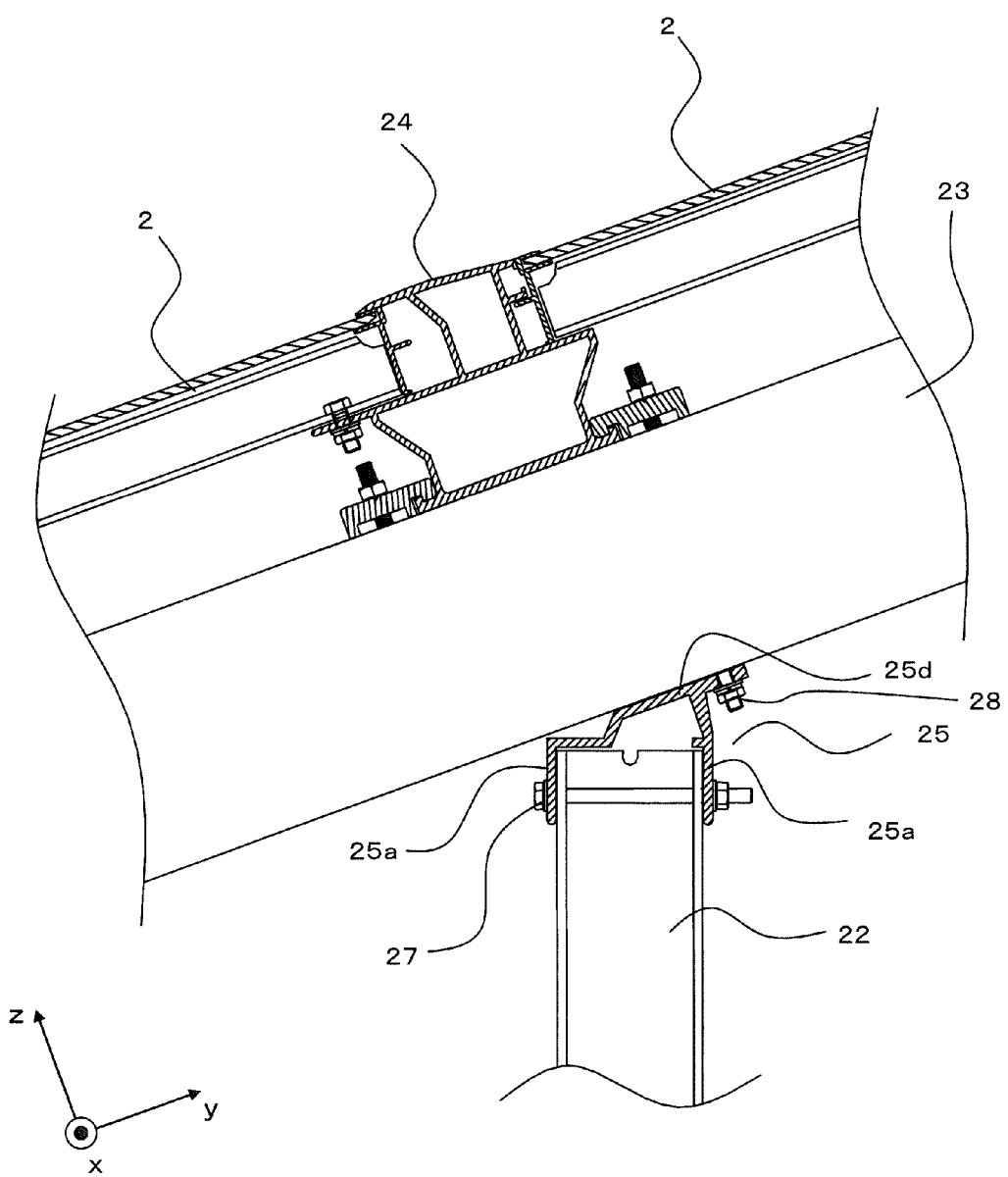

F I G. 9
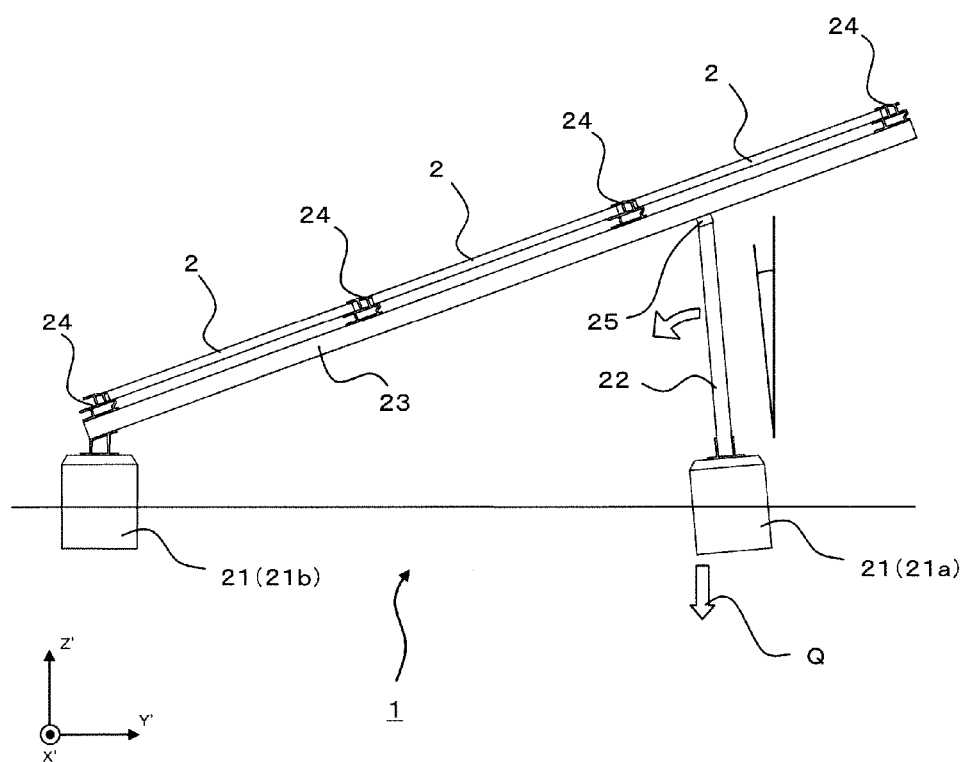

F I G. 1 1
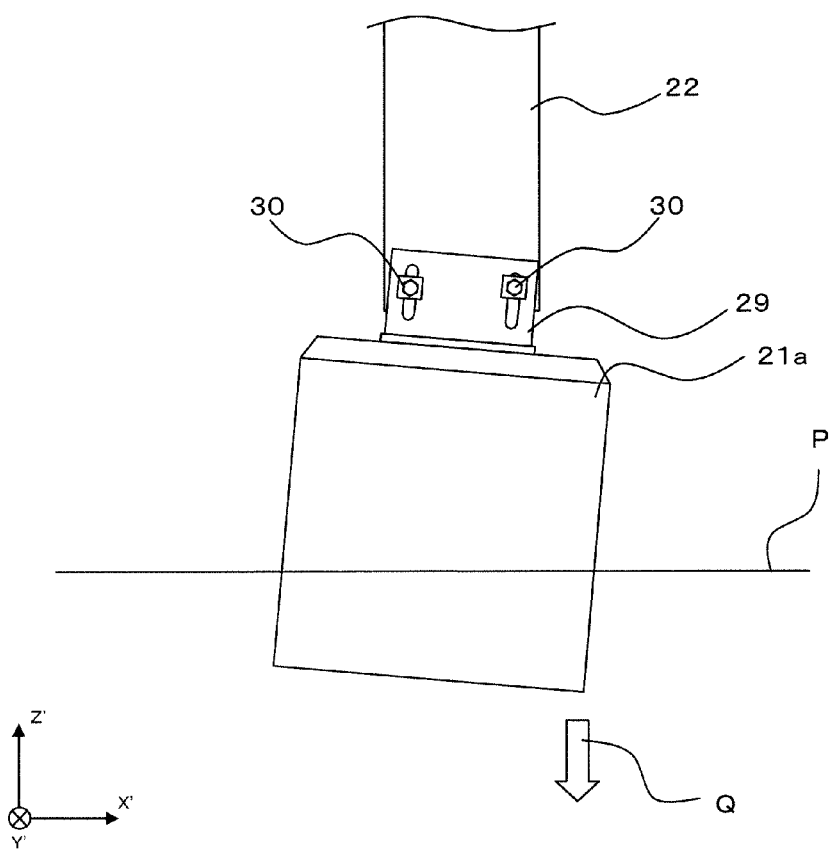

PHOTOVOLTAIC SYSTEM

TECHNICAL FIELD

The present invention relates to photovoltaic systems.

CROSS-REFERENCE TO RELATED APPLICATIONS

This application is national stage application of International Application No. PCT/JP2013/062425, filed on Apr. 26, 2013, which designates the United States, incorporated herein by reference, and which claims the benefit of priority from Japanese Patent Application No. 2012-101783, filed on Apr. 26, 2012; Japanese Patent Application No. 2012-189185, filed on Aug. 29, 2012; and Japanese Patent Application No. 2013-014693, filed on Jan. 29, 2013, the entire contents of which are incorporated herein by reference.

BACKGROUND ART

Photovoltaic systems include photovoltaic cell modules, a stand for mounting the photovoltaic cell modules, and electric components such as an inverter for obtaining an output from the photovoltaic cell modules. Photovoltaic power generation system which is composed of a number of photovoltaic systems and has an output in the order of 1 MW or more is called mega solar systems. In the mega solar systems, a number of photovoltaic systems are required to be constructed with low cost and high quality. Accordingly, a photovoltaic system manufactured with low cost is proposed (for example, see Japanese Unexamined Patent Application Publication No. 2007-251001).

SUMMARY OF INVENTION

Problem to be solved by the Invention

In construction of the above-described photovoltaic system, a process of tightening a nut on a bolt which is inserted into a hole on a rail member while the rail member is supported by an operator is necessary. However, the construction efficiency of this process is low and the working hours are increased. Particularly, when a correction work is necessary due to variation in construction quality during construction of mega solar systems, the work period is extended. This may cause the cost to be increased.

One object of the present invention is to provide a photovoltaic system with good construction efficiency.

Means for solving the Problems

A photovoltaic system according to one embodiment of the present invention includes a pole member which stands on an installation surface, a connecting support member disposed on an upper end section of the pole member, a rail member supported by the connecting support member, and a photovoltaic cell module disposed on the rail member. In this embodiment, the connecting support member includes a lower section that covers at least a portion of an outer peripheral surface of the upper end section of the pole member.

Advantageous Effects of Invention

According to the above configuration, the photovoltaic system may be constructed with a simple operation.

BRIEF DESCRIPTION OF DRAWINGS

FIG. 1 is a perspective view of one embodiment of a photovoltaic system according to the present invention.

FIG. 3A is a plan view of the photovoltaic cell module as seen from a light receiving surface side and FIG. 3B is a cross-sectioned view taken along the line A-A' of FIG. 3A.

FIG. 4B is a view which shows part of one embodiment of the photovoltaic system according to the present invention, and is an enlarged side view of the section B of FIG. 2.

FIG. 9 is a view which shows the photovoltaic system according to another embodiment of the present invention, and is a side view which shows that height adjustment is performed when an uneven settlement occurs.

FIG. 11 is a view which shows the photovoltaic system according to another embodiment of the present invention, and is a side view which shows that height adjustment is performed when an uneven settlement occurs.

FIG. 13A is an exploded perspective view which shows a section D of FIG. 12 in an enlarged form and FIG. 13B is a perspective view which shows the section D of FIG. 12 in an enlarged form.

MODE FOR CARRYING OUT OF THE INVENTION

Figure 2:
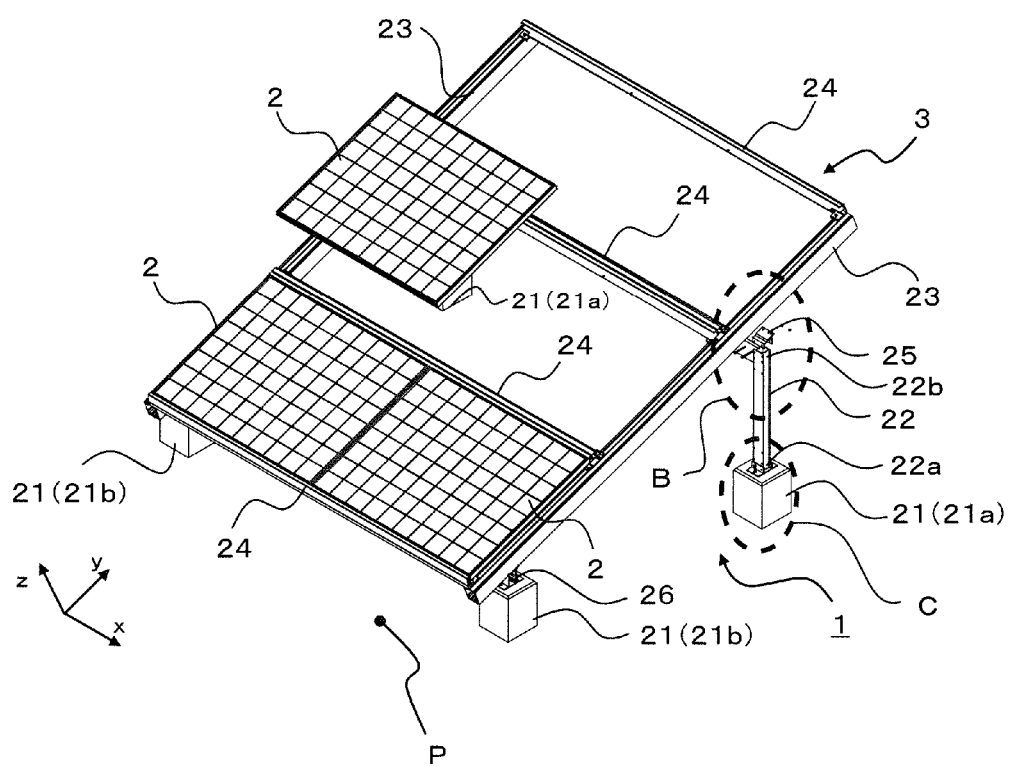
FIG. 2 is an exploded perspective view which shows part of one embodiment of the photovoltaic system in an exploded form according to the present invention.

Embodiments of a photovoltaic system according to the present invention will be described with reference to the drawings. In some drawings, a direction which is parallel to a light receiving surface of a photovoltaic cell module 2 of a photovoltaic system 1 and is vertical to an inclination direction in which the light receiving surface is inclined to an installation surface is referred to as X axis direction, a direction which is parallel to the light receiving surface and is parallel to the inclination direction is referred to as Y axis direction, and a direction which is vertical to the light receiving surface is referred to as Z axis direction. In the drawing such as FIG. 1, a lower side of the photovoltaic system 1 in the inclination direction is hereinafter referred to as an eave side, while an upper side is referred to as a ridge side.

As shown in FIGS. 1 and 2, the photovoltaic system 1 includes pole members 22 which stand on a horizontal installation surface P, connecting support members 25 disposed on the upper end sections of the pole members 22, rail members 23 supported by the connecting support members 25, and photovoltaic cell modules 2 disposed on the rail members 23. The connecting support member 25 includes an upper section which has an upper surface that is inclined to the installation surface P by a predetermined angle to face the lower surface of the rail member 23 and a lower section that covers at least a portion of the outer periphery of the upper end section of the pole member 22.

The photovoltaic system 1 may include foundations 21 that support the pole members 22. Further, the photovoltaic system 1 may include a plurality of traverse rail members 24 which is in parallel to each other and extends in a direction perpendicular to the rail members 23 so that the photovoltaic cell modules 2 are mounted between the adjacent traverse rail members 24. This allows the photovoltaic cell modules 2 to be securely mounted.

Next, each of the components which constitute the photovoltaic cell system 1 will be described in detail.

<Photovoltaic Cell Module>

Figure 3A:
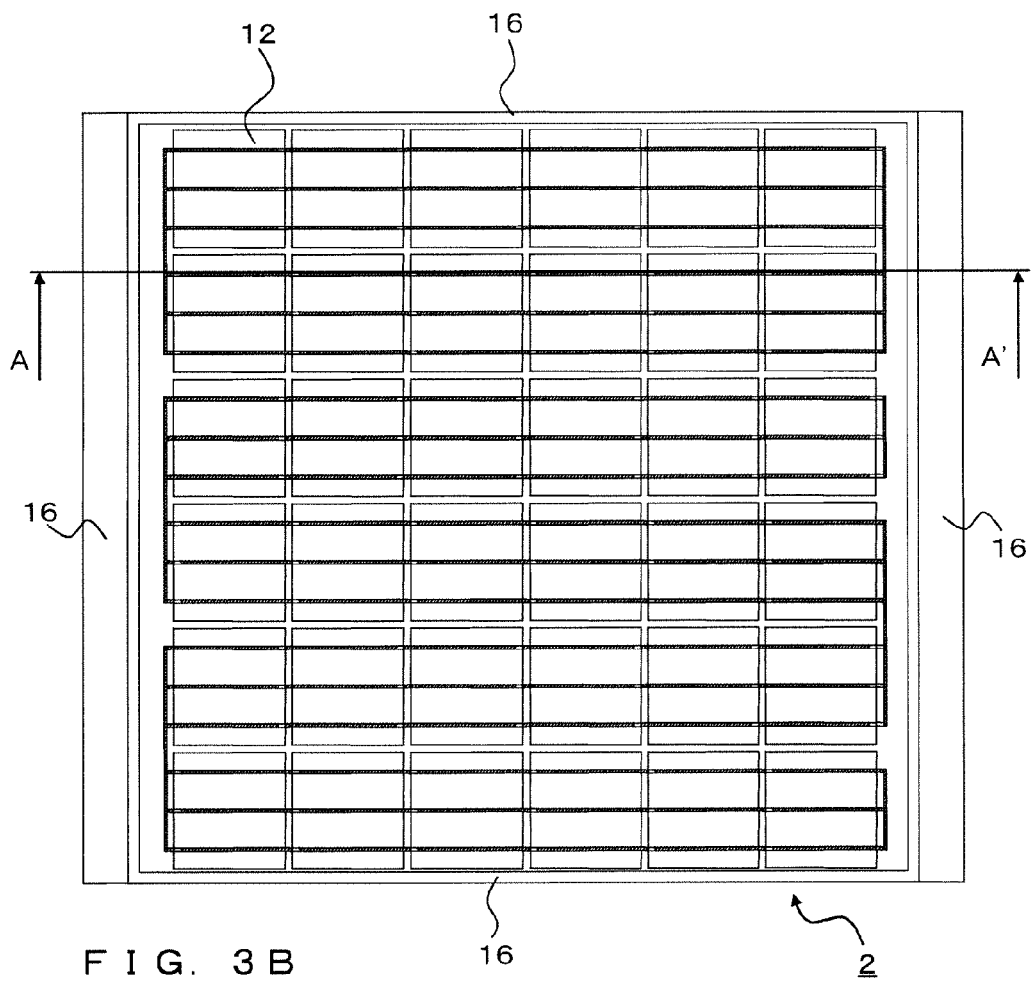
FIGS. 3A and 3B are views which shows one example of a photovoltaic cell module which constitutes one embodiment of the photovoltaic system according to the present invention.
Figure 3B:
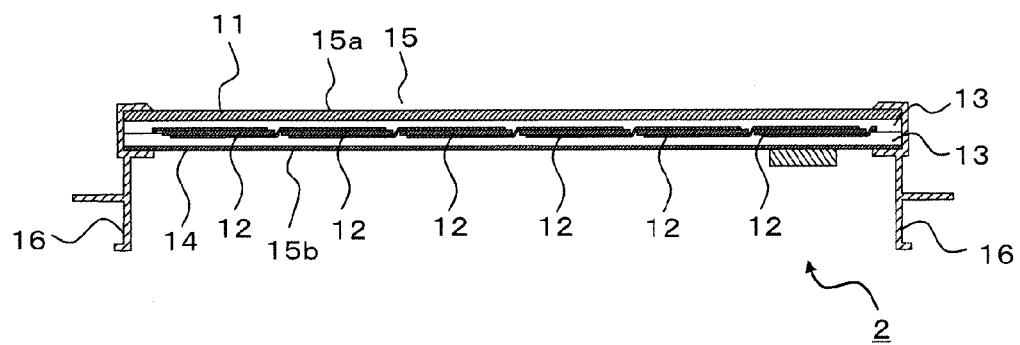

As shown in FIGS. 3A and 3B, the photovoltaic cell module 2 is comprised of a plurality of photovoltaic cell elements 12 which is electrically connected to each other. The photovoltaic cell module 2 may use various configurations such as a superstrate configuration where a light is incident on the substrate which includes the photovoltaic cell elements 12, a double glass configuration where the photovoltaic cell elements are enclosed between the glass substrates, and a substrate configuration where a light is incident on the opposite side of the substrate. Particularly, the superstrate configuration shown in FIGS. 3A and 3B is easily applicable to a single crystalline silicon or a multi-crystalline silicon photovoltaic cell.

The photovoltaic cell module 2 includes a photovoltaic cell panel 15 comprised of a translucent substrate 11, the plurality of photovoltaic cell elements 12 disposed at predetermined positions with respect to the translucent substrate 11, a filler 13 which protects around the photovoltaic cell element 12, and a backside protective member 14. The photovoltaic cell panel 15 includes a light receiving surface 15a on which a light is mainly incident and a back surface (non-light receiving surface) 15b which is located on the back side with respect to the light receiving surface 15a.

The translucent substrate 11 has a function to protect the photovoltaic cell elements 12 and the like on the side of the light receiving surface 15a. The translucent substrate 11 may include, for example, a toughened glass, a white glass and the like.

The photovoltaic cell element 12 has a function to convert the incident light into electricity. The photovoltaic cell element 12 includes, for example, a semiconductor substrate which is made of a single crystalline silicon, a multi-crystalline silicon or the like, and electrodes which are disposed on the front side (upper surface) and the back side (lower surface) of the semiconductor substrate. The photovoltaic cell element 12 that includes the single crystalline silicon substrate or the multi-crystalline silicon substrate is, for example, formed in a rectangular shape in plan view. In this case, the photovoltaic cell element 12 has a side length of, for example, 100-200 mm. Such photovoltaic cell elements 12 are configured such that, for example, the electrode located on the front side of one of the adjacent photovoltaic cell elements 12 is electrically connected to the electrode located on the backside of the other of the adjacent photovoltaic cell elements 12 by a wiring material (inner lead). Accordingly, the plurality of photovoltaic cell elements 12 are arranged in series connection. The wiring material may include, for example, a solder-coated copper foil.

The photovoltaic cell element 12 is not limited to a specific type. In addition to the above, for example, a thin film type photovoltaic cell element which includes a photoelectric conversion element made of an amorphous silicon based material, chalcopyrite based material such as CIGS, CdTe based material or the like may be used. The above described thin film type photovoltaic cell element may include, for example, a photoelectric conversion layer made of an amorphous silicon based material, CIGS based material, CdTe based material or the like, transparent electrodes and the like, which are appropriately stacked on the glass substrate. Such a thin film type photovoltaic cell element may be achieved by integrating the photoelectric conversion layer and the transparent electrodes on the glass substrate by performing a patterning process. Accordingly, in the thin film type photovoltaic cell element, a wiring material for connecting a plurality of photoelectric conversion layers may be eliminated. Further, the photovoltaic cell element 12 may be of a type in which an amorphous silicon thin film is formed on a single crystalline or a multi-crystalline silicon substrate.

The filler 13 which is disposed on both main surface sides of the photovoltaic cell element 12 has a function to seal the photovoltaic cell element 12. The filler 13 may include, for example, a thermoset resin such as a copolymer of ethylene vinyl acetate.

The backside protective member 14 has a function to protect the photovoltaic cell elements 12 and the like on the backside thereof. The backside protective member 14 is bonded to the filler 13 which is located on the backside of the photovoltaic cell panel 15. The backside protective member 14 may be a laminate of, for example, PVF (polyvinyl fluoride), PET (polyethylene terephthalate), PEN (polyethylene naphthalate) and any combination thereof.

A frame 16 may be disposed on the peripheral edge of the photovoltaic cell panel 15. The frame 16 is provided to protect the outer periphery of the photovoltaic cell panel 15 and has a function to improve load bearing of the photovoltaic cell module 2 and protect the photovoltaic cell module 2 from impact. The frame 16 may be formed by, for example, extrusion molding of a metal such as aluminum alloy.

<Stand>

A stand 3 is a structure that supports the photovoltaic cell modules 2. Components of the stand 3 will be described from its lower side. As shown in FIGS. 1 and 2, the stand 3 is supported by the foundations 21 which are disposed on the installation surface P such as ground. The foundations that support the ridge side are hereinafter referred to as first foundations 21a, and the foundations that support the eave side are hereinafter referred to as second foundations 21b. The pole members 22 are disposed on the first foundations 21a. Further, the connecting support members 25 are fixed on the pole members 22. Fixing members 26 which are made of, for example, an aluminum alloy are fixed on the second foundations 21b. Moreover, the rail members 23 are disposed between the upper ends of the connecting support members 25 and the fixing members 26. The plurality of traverse rail members 24 are provided to extend between the rail members 23 which are arranged in parallel. The longitudinal direction of the traverse rail member 24 is perpendicular to the longitudinal direction of the rail member 23. The plurality of traverse rail members 24 is arranged with an interval substantially equal to the width of the photovoltaic cell module 2. In addition, one or more foundations and pole members may be disposed between the second foundations 21b of the foundations 21 which support the eave side and the foundations 21 of the ridge side.

<Foundation>

The foundation 21 has a function as a foundation of the photovoltaic system 1. The foundation 21 may include, for example, a footing foundation embedded in the ground. In the case of soft ground, the width of the bottom of the footing foundation may be increased to reduce the pressure of ground contact. Since a wide area on the bottom of the footing foundation is supported on the ground, use of the footing foundation can reduce distortion of the photovoltaic system 1 due to uneven settlement of the foundations 21, thereby reducing breakage of the photovoltaic cell modules 2.

The foundation 21 may include a screw pile which is a type of friction pile, for example, made of a stainless steel material. The screw pile is formed by providing a helical wing on the outer periphery of the pile body which has a circular cross-section to improve skin friction and pull-out resistance. By using such a friction pile as the foundation 21, the pull-out resistance under a wind pressure in the blow-up direction being applied to the photovoltaic system 1 is increased. Accordingly, the strength of the photovoltaic system 1 can be increased.

<Pole Member>

The pole member 22 is a pole body which is disposed on the first foundation 21a via a pole supporting member 29 with the longitudinal direction being vertical to the installation surface P. The pole member 22 supports the ridge side of the photovoltaic system 1 as shown in FIGS. 1 and 2. The pole member 22 includes a lower end section 22a that is fixed on the first foundation 21a and an upper end section 22b that supports the rail member 23 via a connecting support member 25.

Figure 4A:
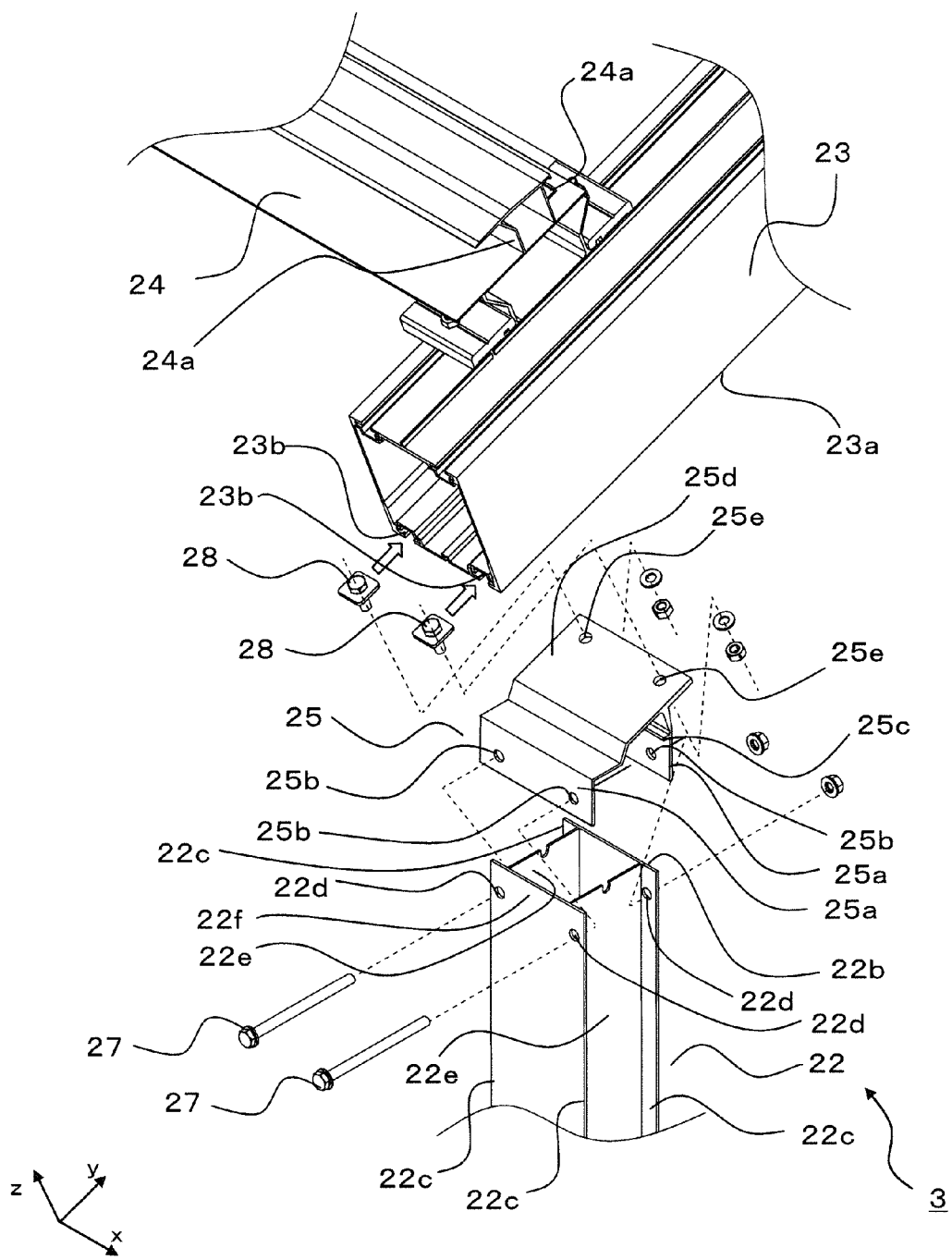
FIG. 4A is a view which shows part of one embodiment of the photovoltaic system according to the present invention, and is an enlarged exploded perspective view which shows a section B of FIG. 2 in an enlarged and exploded form.

As shown in FIG. 4A, a cross sectional shape of the pole member 22 in the cross section perpendicular to the longitudinal direction of the pole member 22 may be I-shape, T-shape or H-shape. Further, the pole member 22 may include a tubular section which extends in the longitudinal direction. This improves strength of the pole member 22.

The pole member 22 may include, for example, four flanges (first flanges 22c) that protrude from two opposite sides of the square pipe. The pole member 22 may be formed by, for example, extrusion molding of a metal such as aluminum alloy.

First holes 22d are disposed in the upper section of the pole member 22 so that the connecting support member 25 is connected to the first flanges 22c by using fastening members (first fastening members 27). The fastening members 27 are inserted into the holes (first holes 22d) on the opposite first flanges 22c and holes 25b on the connecting support member 25, thereby connecting the fixing support member 25 to the pole member 22.

<Pole Supporting Member>

The pole supporting member 29 includes a bottom section 29d that is disposed on the first foundation 21a, and a wall section 29a that is connected to the bottom section 29d and covers at least a portion of the outer peripheral surface of the lower end section of the pole member 22.

<Connecting Support Member>

As shown in FIG. 4B, the connecting support member 25 is a member that fixes the rail member 23 on the pole member 22. The connecting support member 25, for example, has a length in the X axis direction which is substantially the same as that of the pole member 22. Further, the connecting support member 25 is formed to be slightly longer than a length of the pole member 22 in a direction perpendicular to the X axis direction (by an amount in the order of a thickness of the connecting support member 25). A lower section of the connecting support member 25 includes plate sections 25a that oppose each other with an interval substantially equal to that of the cross section of the pole member 22 taken in a direction vertical to the longitudinal direction of the pole member 22.

The plate sections 25a is internally in contact with the outer peripheral surface 22f of the pole member 22 when the connecting support member 25 is covered on the upper end section 22b of the pole member 22. The plate section 25a includes a plurality of holes 25b at positions which correspond to a plurality of first holes 22d which are disposed in the upper section of the pole member 22. Further, at least one of two plate sections 25a includes a protrusion 25c on the inner surface. The protrusion 25c is in contact with the upper end section 22b of the pole member 22 to determine a fitting distance of the connecting support member 25 to the pole member 22.

An upper section of the connecting support member 25 includes an upper surface 25d that is in contact with the lower surface 23a of the rail member 23 to support the rail member 23. The upper surface 25d is inclined to the installation surface (ground) P when the connecting support member 25 is mounted on the pole member 22. The upper surface 25d is in contact with the lower surface 23a of the rail member 23. Further, a plurality of holes 25e is formed on the upper surface 25d so that the rail member 23 is fixed on the connecting support member 25 by using the holes 25e, recesses 23b of the rail member 23 and fourth fastening members 28. The fourth fastening member 28 may be, for example, comprised of a bolt and a nut. The connecting support member 25 may be formed by, for example, extrusion molding of a metal such as aluminum alloy.

<Fixing Member>

Figure 5:
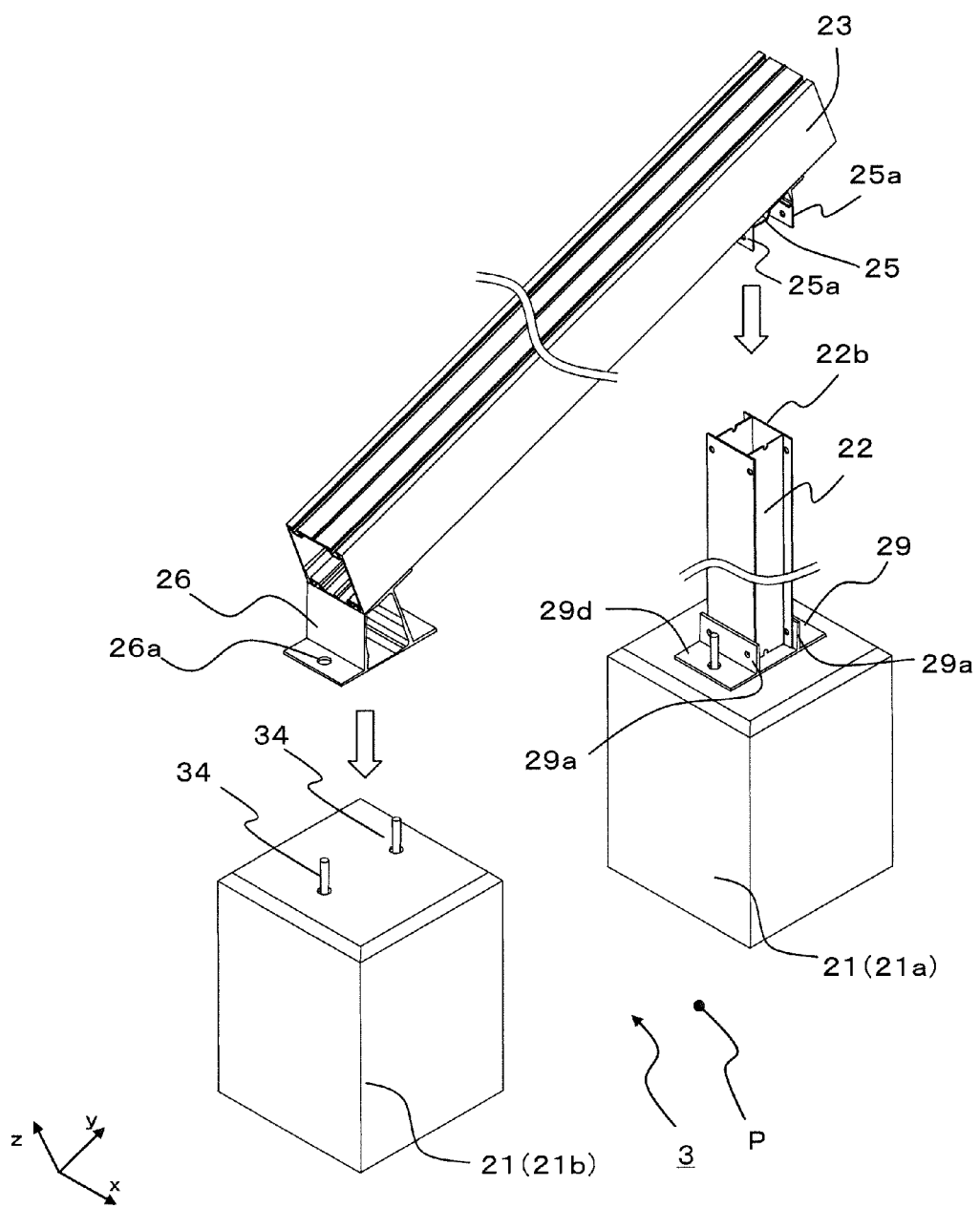
FIG. 5 is an exploded perspective view which shows assembly of one embodiment of the photovoltaic system according to the present invention.

As shown in FIGS. 1, 2 and 5, the fixing member 26 is a member that fixes the rail member 23 on the second foundation 21b. The upper section of the fixing member 26 may be substantially the same shape as the upper section of the connecting support member 25. Further, the lower section of the fixing member 26 is, for example, formed in a flat plate shape and has a plurality of holes 26a through which anchor bolts 34 provided to be dug into the second foundation 21b are fastened. The fixing member 26 may be formed by, for example, extrusion molding of a metal such as aluminum alloy.

<Rail Member>

As shown in FIGS. 1, 2, 4A, 4B and 5, the rail member 23 is a member that is provided to extend between the upper ends of the connecting support member 25 and the fixing member 26 and is fixed inclined to the installation surface P. Further, the traverse rail members 24 are disposed and fixed on the rail member 23 which are arranged in parallel so that the traverse rail members 24 extend perpendicular to the longitudinal direction of the rail member 23. As shown in FIG. 4A, the cross sectional shape of the rail member 23 may be that of a square pipe. In addition, a plurality of recesses 23b are formed on the lower surface 23a of the rail member 23 along the longitudinal direction of the rail member 23 so that part of the fourth fastening member 28 is inserted into the recesses 23b. The recess 23b can be used to fix the rail member 23 on the fixing member 26 and the connecting support member 25. The rail member 23 may be formed by, for example, extrusion molding of a metal such as aluminum alloy.

<Traverse Rail Member>

As shown in FIGS. 1, 2 and 4A, the traverse rail member 24 is disposed on the rail member 23 with the longitudinal direction of the traverse rail member 24 being in the X axis direction. As shown in FIG. 4A, the traverse rail member 24 includes a fixing section 24a that fixes one end of the photovoltaic cell module 2 so that the photovoltaic cell module 2 is fixed on the traverse rail member 24. The traverse rail member 24 may be formed by, for example, extrusion molding of a metal such as aluminum alloy.

As shown in FIGS. 4A and 4B, the connecting support member 25 includes the plate sections 25a that cover the outer peripheral surface 22f of the upper end section 22b of the pole member 22. A pair of plate sections 25a is disposed to hold the outer peripheral surface 22f of the upper end section 22b of the pole member 22 therebetween. This allows the connecting support member 25 to be fit into part of the pole member 22 by placing the connecting support member 25 on the pole member 22. As a result, the rail member 23 is prevented from being displaced with respect to the pole member 22. Accordingly, an operator does not need to align bolt holes while holding the member by his/her hand and tighten a bolt and a nut. This improves construction efficiency.

In addition, the connecting support member 25 is open on the side perpendicular to the opposite plate sections 25a. Accordingly, when the pole member 22 is long, the first fastening member 27 can be tightened after the connecting support member 25 is inserted from the lateral side. This improves workability.

Further, as shown in FIGS. 4A, 4B and 5, the connecting support member 25 can be fixed on the rail member 23 at a predetermined position in advance by using the fourth fastening member 28, and then the rail member 23 can be placed on the pole member 22 to fix the plate sections 25a on the upper end section 22b of the pole member 22. This prevents the rail member 23 from being slipped off from the pole member 22 before the first fastening member 27 is mounted. Accordingly, an operator can work safely even when working alone.

Further, the connecting support member 25 and the rail member 23 can be pre-assembled by the fourth fastening member 28 in a factory or the like and then transported to the installation site. This contributes to shorten the work period and improve assembly precision.

The first holes 22d of the pole member 22 are disposed on the first flange 22c. This prevents a hollow cross section of the pole member 22 from being collapsed by the first fastening members 27, since inner walls 22e support the compression force even if the first fastening members 27 are tightened.

Further, since the first fastening members 27 being inserted between the opposite holes 22d can be visually observed from outside, the construction efficiency can be improved and an inspection after completion can be easily performed in a short period of time.

<Second Embodiment>

In this embodiment, the foregoing upper surface 25d of the connecting support member 25 is provided with, for example, a plurality of projections 25f so that the projections 25f are positioned in the plurality of recesses 23b on the lower surface 23a of the rail member 23.

Figure 6:
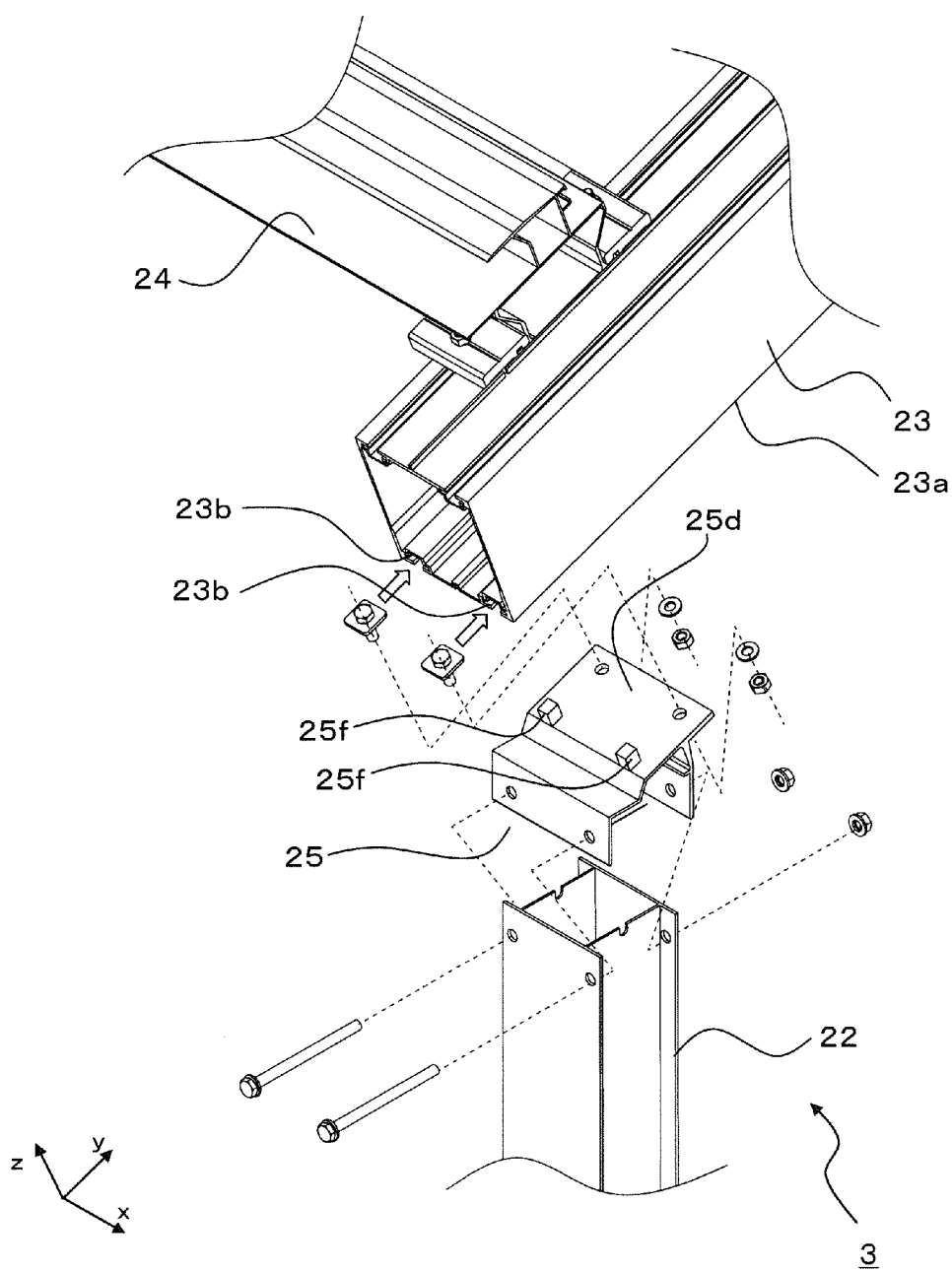
FIG. 6 is a view which shows the photovoltaic system according to another embodiment of the present invention, and is an enlarged exploded perspective view which shows a variation of the section B of FIG. 2.

Specifically, as shown in FIG. 6, the connecting support member 25 includes the projections 25f which extend in the Z axis direction at positions which correspond to the recesses 23b of the rail member 23. The projection 25f is formed, for example, in a cuboid shape. The projection 25f may have a width in the X axis direction which is substantially the same as that of the recess 23b of the rail member 23 in the X axis direction. The projection 25f may be formed in a hook shape instead of a cuboid shape. With this shape, a strength against negative pressure is improved.

Accordingly, the projections 25f can increase the strength against deformation in a direction in which the rail member 23 rotates on the connecting support member 25.

Further, the projection 25f can serve as a guide when the rail member 23 and the connecting support member 25 are assembled. This improves construction efficiency.

Alternatively, the upper surface of the connecting support member 25 may be provided with a recess or an indentation. In this case, a projection or an indentation that corresponds to the recess or the indentation on the connecting support member 25 may be provided on the lower surface of the rail member 23.

<Third Embodiment>

Next, the third embodiment will be described. In FIGS. 7 to 12, which are used for description of this embodiment, a direction which is parallel to the eave side of the photovoltaic system 1 and is parallel to the installation surface is referred to as X' axis direction, a direction which is vertical to the eave side of the photovoltaic system 1 and is parallel to the installation surface is referred to as Y' axis direction, and a direction which is vertical to the installation surface is referred to as Z' axis direction.

In this embodiment, the plate section 25a of the connecting support member 25 is provided with a first serration section 25g as a first fitting section on the back side of the surface which faces the outer peripheral surface of the pole member 22. Further, in this embodiment, the first fastening member 27 is provided with a second serration section 27b on the surface that is in contact with the first serration section 25g as a second fitting section that is configured to fit with the first serration section 25g. The second serration section 27b is capable of fitting with the first serration section 25g at a plurality of positions in the longitudinal direction of the pole member 22 (Z' axis direction).

Figure 7A:
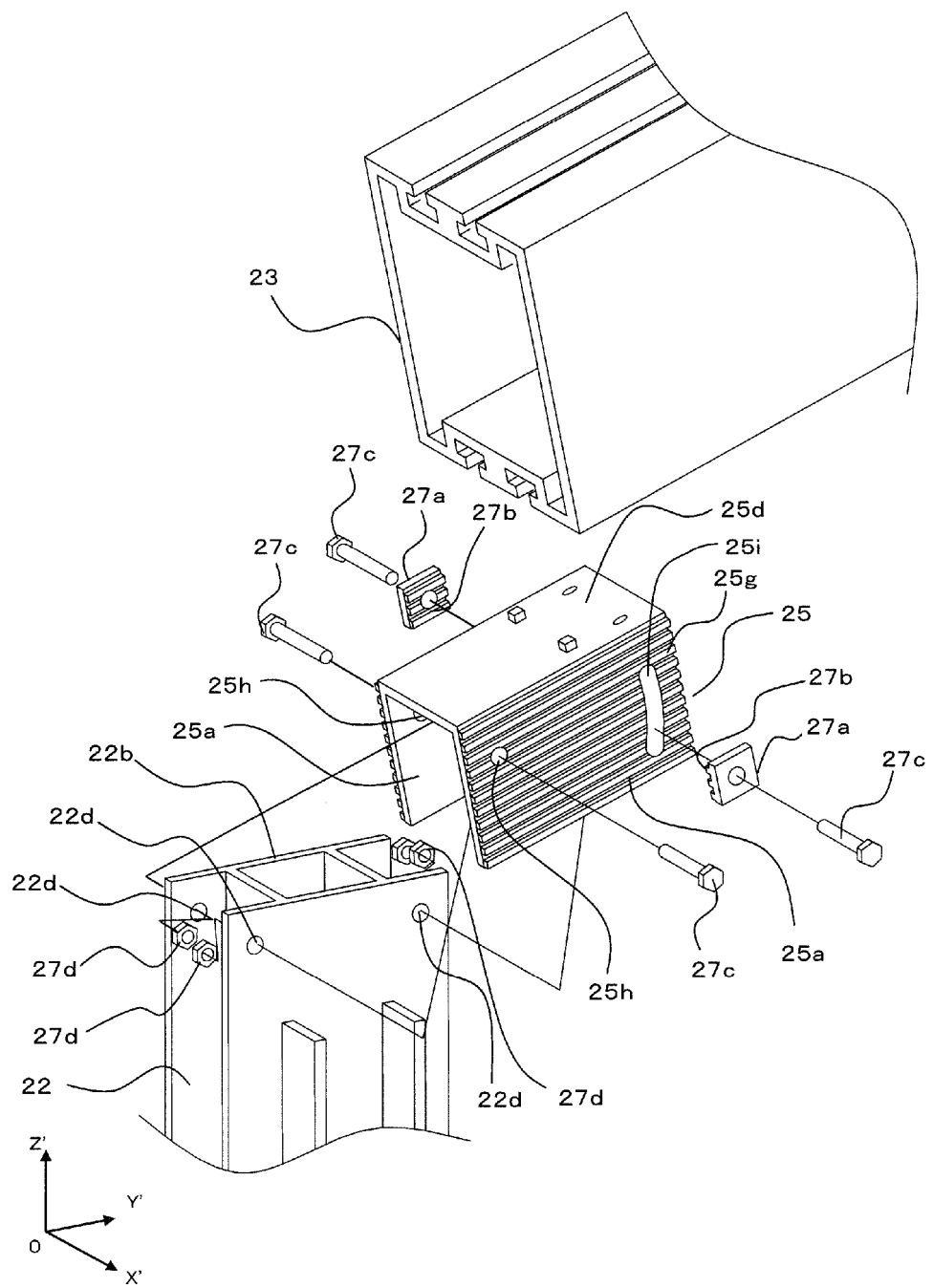
FIG. 7A is a view which shows the photovoltaic system according to another embodiment of the present invention, and is an enlarged exploded perspective view which shows a variation of the section B of FIG. 2.
Figure 7B:
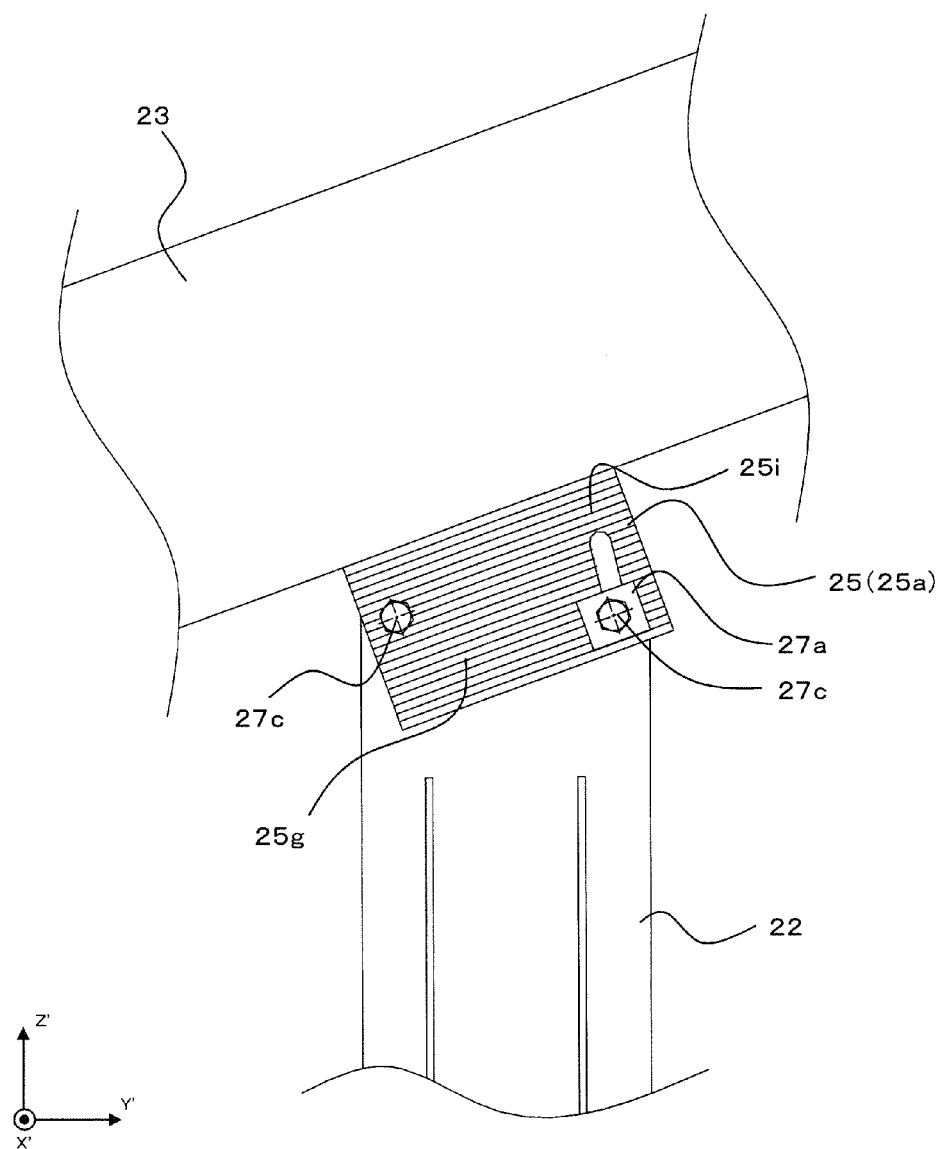
FIG. 7B is a view which shows the photovoltaic system according to another embodiment of the present invention, and is an enlarged side view which shows a variation of the section B of FIG. 2.

Specifically, in this embodiment, the first serration section 25g in which recesses and projections are alternately arranged in the Z' axis direction of the plate section 25a of the connecting support member 25 is provided as shown in FIG. 7A. Further, the plate section 25a includes an elongate hole (first elongate hole 25i) which extends in the longitudinal direction of the pole member 22 (Z' axis direction) as shown in FIG. 7B.

The first fastening member 27 which is positioned in the first elongate hole 25i includes a first washer 27a. The first washer 27a is provided with a second serration section 27b on the surface that is in contact with the first serration section 25g of the connecting support member 25 to be capable of fitting with the first serration section 25g. Accordingly, when the first serration section 25g of the connecting support member 25 and the second serration section 27b of the first washer 27a are fitted together, displacement due to loosening of the first fastening member 27 is reduced compared with fixing by using the conventional bolt and nut. Further, in this embodiment, the angle can be fixed by an operator lightly tightening a bolt 27c and a nut 27d with his/her hand, thereby improving the construction efficiency.

Figure 8A:
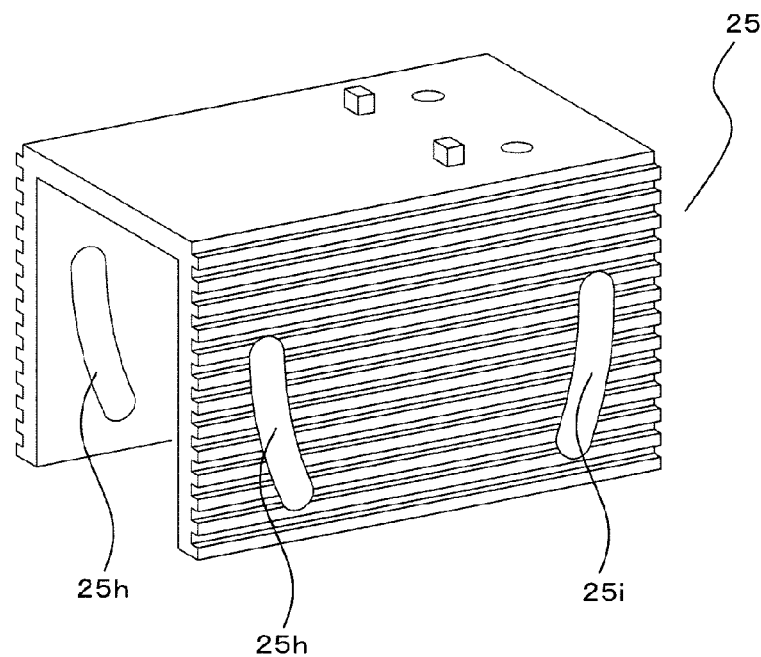
FIGS. 8A and 8B are views which show the photovoltaic system according to another embodiment of the present invention, and are side views which show a variation of holes of a connecting support member.
Figure 8B:
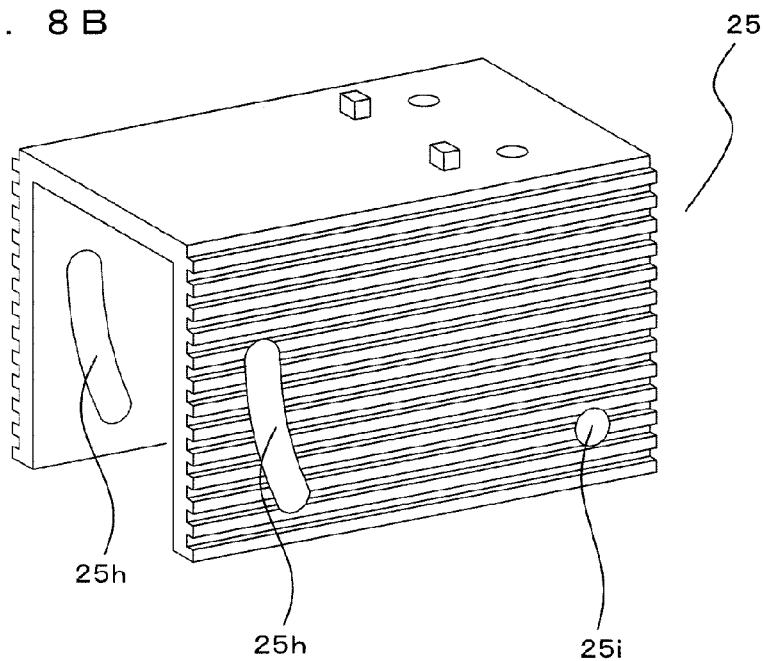

In this embodiment, the first elongate hole 25i is provided on the ridge side of the plate section 25a. Accordingly, the connecting support member 25 can be fixed on the pole member 22 by the bolt 27c and the nut 27d with the first washer 27a of the first fastening member 27 being positioned at any position of the first elongate hole 25i. This allows the inclination angle of the upper surface 25d of the connecting support member 25 can be fixed at any angle. Further, in this embodiment, two positions of the hole 25h and the first elongate hole 25i are used for fixation. Accordingly, fixed support rather than hinged support (pin, hinge) is provided. Consequently, loosening between the bolt 27c and the nut 27d caused by deflection and the like due to temperature change or load does not likely occur, and reliability after the construction is improved. In addition, the hole 25h and the first elongate hole 25i are not limited to the shape shown in FIGS. 7A and 7B. For example, as shown in FIGS. 8A and 8B, the positions of the circular hole and the elongate hole may be replaced with each other (FIG. 8B). Alternatively, the hole 25h may be also elongated shape (FIG. 8A).

This embodiment may be used, for example, in areas where mega solar systems are installed. Such areas may often be reclaimed sites or the like where uneven settlement is likely to occur. Uneven settlement is a phenomenon in which the amounts of settlement differ in different positions. When a foundation is significantly inclined due to uneven settlement Q during construction, it is difficult to align screw hole positions. In this case, the foundation 21 may need to be reinstalled.

In this embodiment, as described above, the inclination angle of the upper surface 25d of the connecting support member 25 can be tightly fixed at any angle. Accordingly, for example, as shown in FIG. 9, even if the foundation 21 is inclined in the arrow direction of the figure due to uneven settlement before the rail member 23 is fixed, the angle of the connecting support member 25 can be appropriately adjusted by fixing the first washer 27a at an appropriate position via the first elongate hole 25i. As a result, a problem such as interruption of construction due to misalignment of angle or screw holes of the connecting support member 25 and the rail member 23 can be reduced, thereby improving the construction efficiency. Further, angle adjustment of the photovoltaic cell module can be performed.

<Fourth Embodiment>

Figure 10:
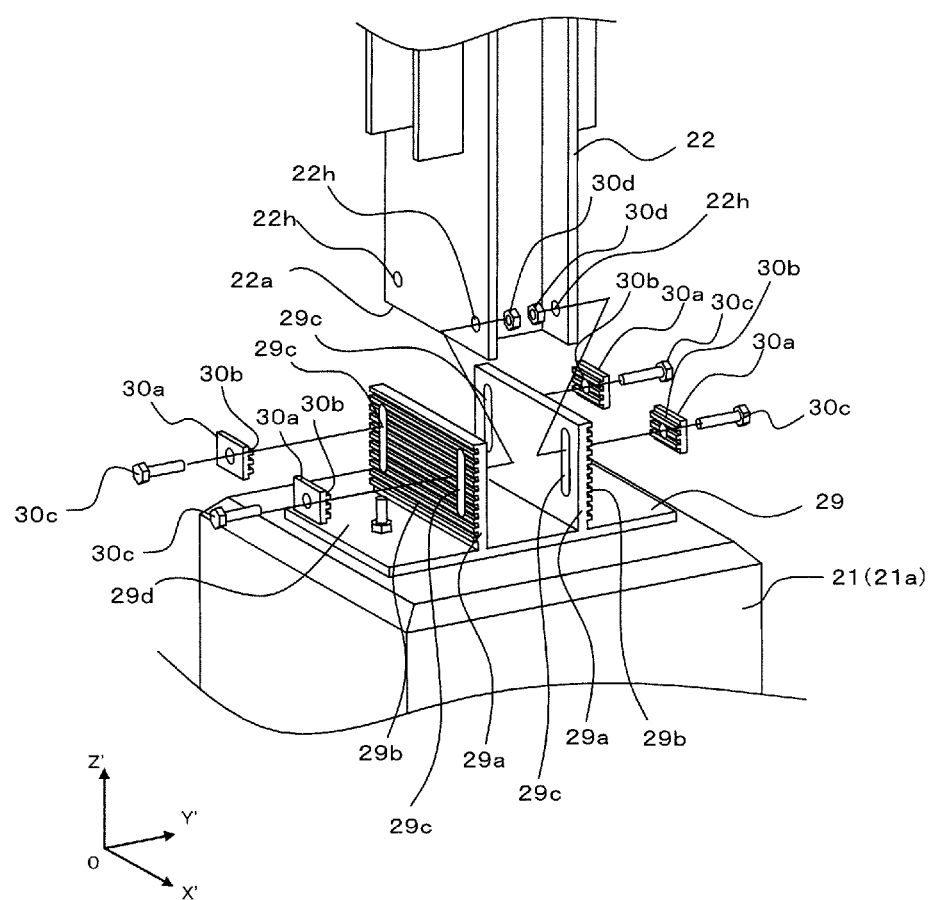
FIG. 10 is a view which shows the photovoltaic system according to another embodiment of the present invention, and is an enlarged exploded perspective view which shows a variation of a section C of FIG. 2.

In this embodiment, as shown in FIG. 10, the pole supporting member 29 is disposed between the foundation 21 which is disposed on the installation surface and the pole member 22. Further, in this embodiment, a second fastening member 30 is disposed to fix the pole member 22 on the pole supporting member 29.

As shown in FIG. 10, the pole supporting member 29 includes the bottom section 29d that is disposed on the first foundation 21a. Further, the pole supporting member 29 includes the wall section 29a that covers at least a portion of the outer peripheral surface of the lower end section of the pole member 22. The wall section 29a is connected to the bottom section 29d. The wall section 29a includes elongate holes (second elongate hole 29c) which extend in the longitudinal direction of the pole member 22 (Z' axis direction) on both ends sides of the wall section 29a in the X' axis direction. The second elongate holes 29c are disposed at least two positions with their longitudinal direction being in parallel to each other. Further, a second hole 22h into which the second fastening member is inserted is disposed at positions on the lower side of the pole member 22.

In this embodiment, for example, as shown in FIG. 11, even if the first foundation 21a is obliquely inclined relative to the installation surface P due to uneven settlement, the inclination of the pole member 22 can be corrected by adjusting the fixation position of the second fastening member 30. As a result, the pole member 22 can be oriented vertically. Accordingly, when a plurality of pole members 22 are installed, a problem such as interruption of construction due to varying height or inclination of the pole members 22 can be reduced, thereby improving the construction efficiency. Further, the pole supporting member 29 may be used for adjustment of height or angle of the photovoltaic cell modules.

In this embodiment, the pole supporting member 29 is provided with a third serration section 29b as a third fitting section on the back side of the surface which faces the outer peripheral surface of the pole member 22. Further, a second fastening member 30 includes a second washer 30a as shown in FIG. 10. The second washer 30a is provided with a fourth serration section 30b on the surface that is in contact with the third serration section 29b as a fourth fitting section that is configured to fit with the third serration section 29b. The fourth serration section 30b is capable of fitting with the third serration section 29b at a plurality of positions in the longitudinal direction of the pole member 22 (Z' axis direction).

Accordingly, when the third serration section 29b of the pole supporting member 29 and the fourth serration section 30b of the second washer 30a are fitted together, displacement due to loosening of the second fastening member 30 is reduced compared with fixing by using the conventional bolt and nut. Further, with this fitting configuration, the angle can be fixed by an operator lightly tightening a bolt 30c and a nut 30d with his/her hand, thereby improving the construction efficiency.

Further, in this embodiment, two positions of the second elongate holes 29c are used for fixation by the second fastening member 30. Accordingly, fixed support rather than hinged support (pin, hinge) is provided. Consequently, loosening between the bolt 30c and the nut 30d caused by deflection and the like due to temperature change or load does not likely occur, and reliability after the construction is improved.

In addition, in this embodiment, the pole supporting member 29 may be disposed not on the foundation 21. For example, in order to increase the height of the pole supporting member 29, an additional member may be provided between the pole supporting member 29 and the foundation 21.

<Fifth Embodiment>

Figure 12:
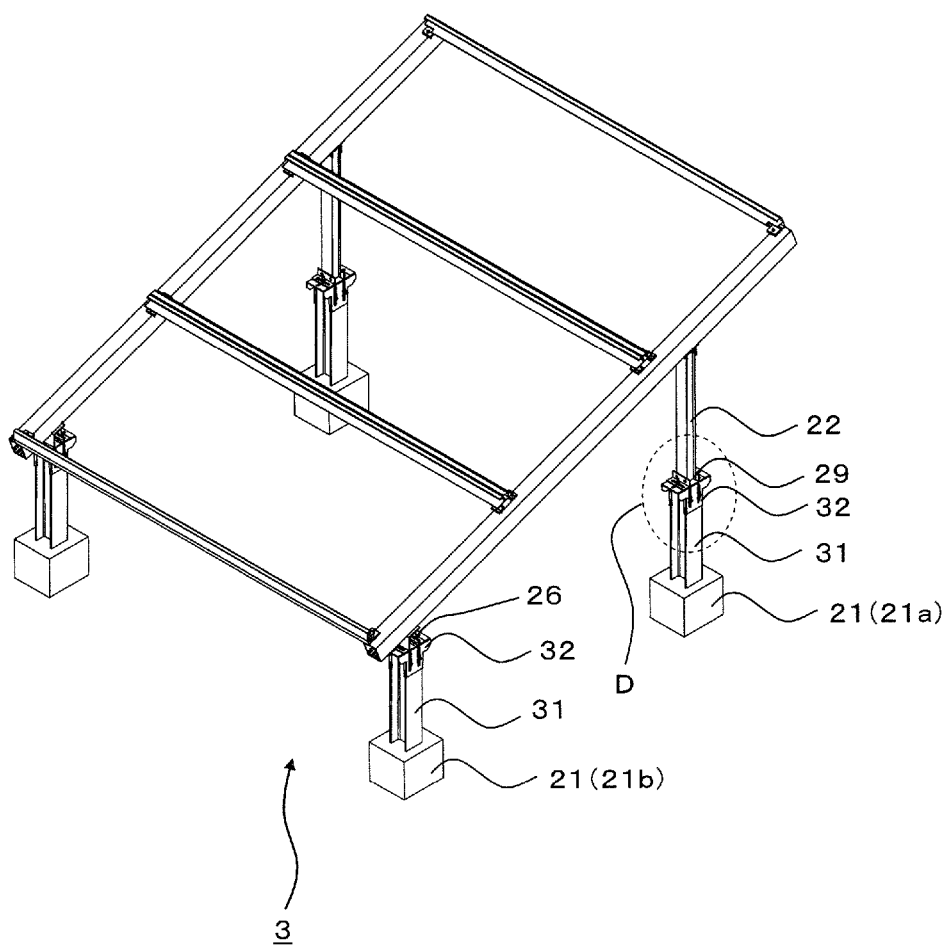
FIG. 12 is a perspective view of a stand of the photovoltaic system according to another embodiment of the present invention.
Figure 13A:
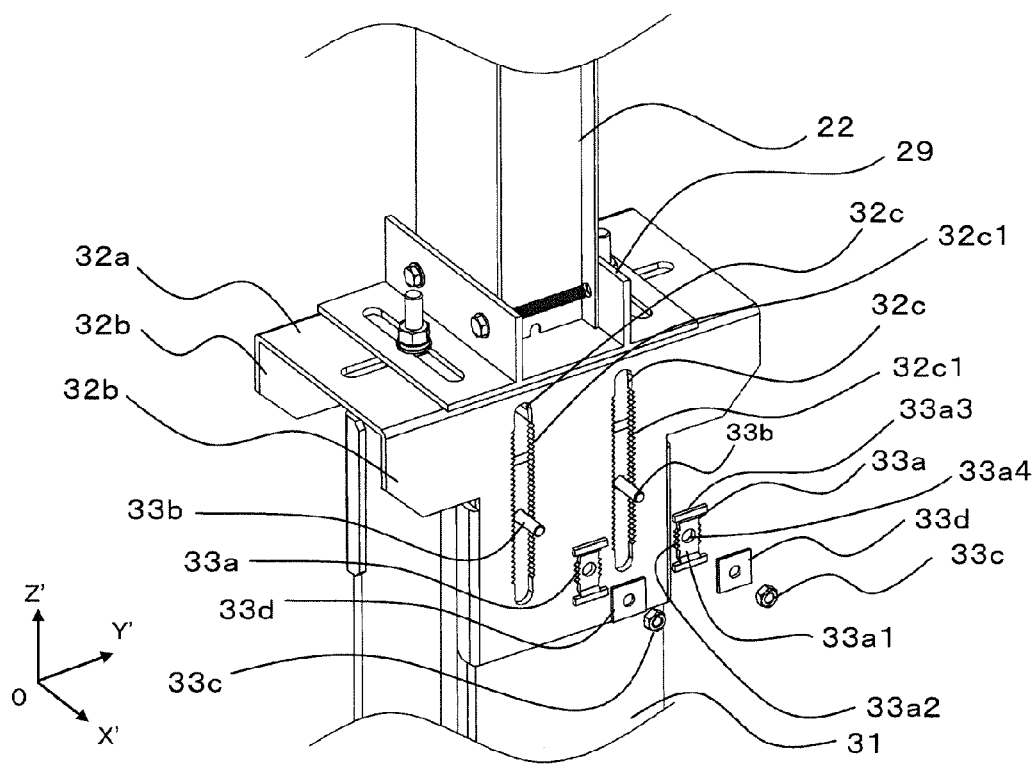
FIGS. 13A and 13B are views of the photovoltaic system according to another embodiment of the present invention.
Figure 13B:
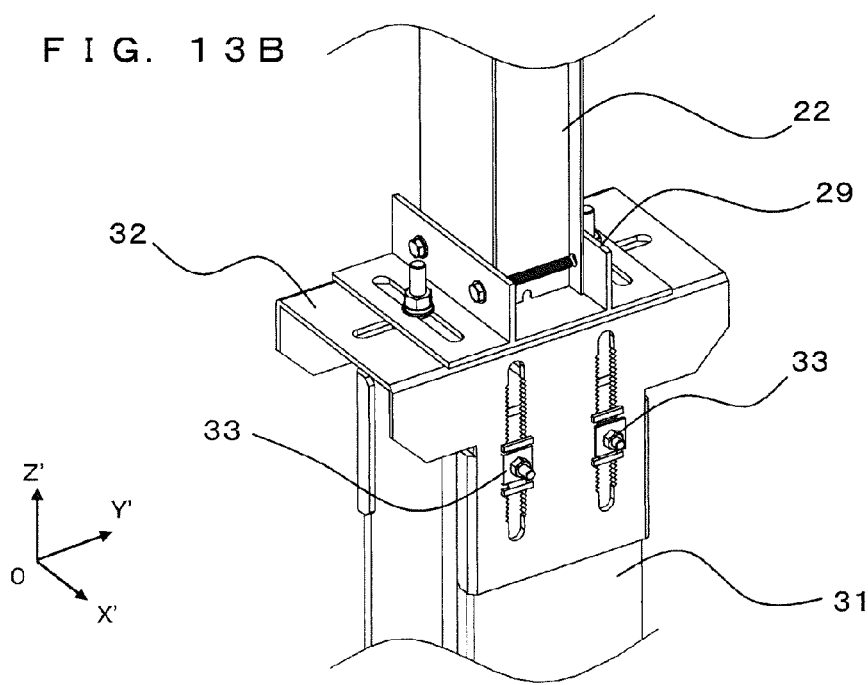
Figure 14:
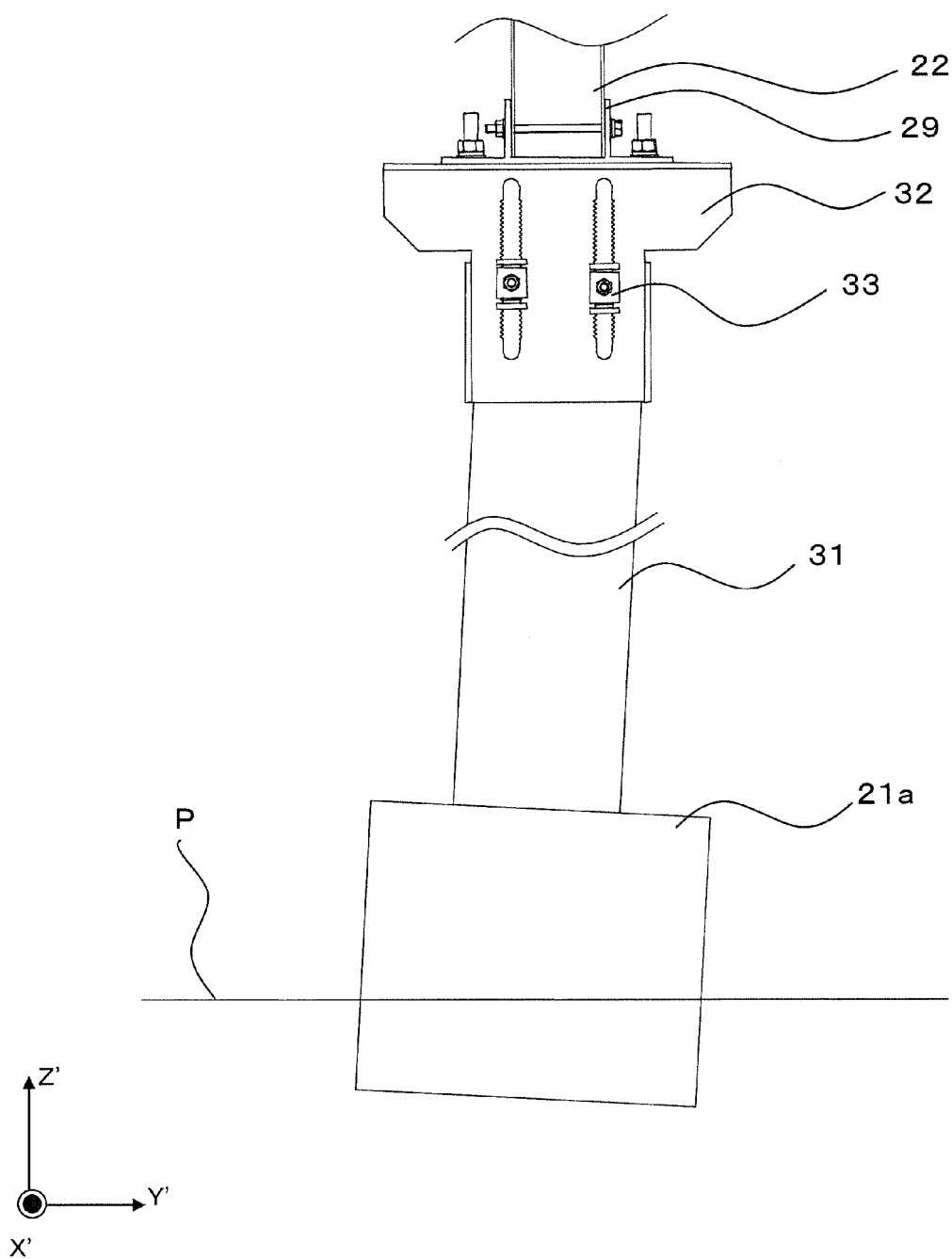
FIG. 14 is a view which shows the photovoltaic system according to another embodiment of the present invention, and is a plan view which shows that height and angle adjustment is performed by using the section D of FIG. 12.

In this embodiment, as shown in FIGS. 12 to 14, the pole member includes a first pole member 22 located on the side of the photovoltaic cell module 2 and a second pole member 31 located on the side of the installation surface P. In this embodiment, as shown in FIG. 12, the second pole member 31 and a pole connecting member 32 are disposed between the first foundation 21a which is disposed on the installation surface P and the pole supporting member 29. Accordingly, in this embodiment, the pole supporting member 29 supports the lower side of the first pole member 22. Further, in this embodiment, a third fastening member 33 is disposed to fix the pole connecting member 32 on the second pole member 31.

The pole connecting member 32 includes an upper plate 32a and two side plates 32b which extend downward from the upper plate 32a as shown in FIG. 13A. A pair of side plates 32b is disposed to cover a portion of the second pole member 31. The pair of side plates 32b may be arranged in parallel to hold the second pole member 31 therebetween. Further, the side plate 32b includes an elongate hole 32c (third elongate hole) which extends in the longitudinal direction of the second pole member 31. A fifth fitting section 32c1 (fifth serration section) which is, for example, formed of serrated indentations is disposed on the inner peripheral surface of the straight portion of the elongate hole 32c.

Further, the third fastening member 33 includes a third washer 33a, a bolt 33b, a nut 33c and a square washer 33d. The third washer 33a includes a main surface section 33a1 and sixth fitting sections 33a2 (sixth serration section) formed of a serrated indentations on the side faces. The third washer 33a further includes a stopper sections 33a3 on both sides of the main surface section 33a1 and a round hole 33a4 on the main surface section 33a1. The stopper section 33a3 is formed to be larger than the width of the elongate hole 32c of the pole connecting member 32.

The fifth fitting section 32c1 of the pole connecting member 32 fits with the sixth fitting section 33a2 of the third washer 33a of the third fastening member 33. In this embodiment, serrated portions comprised of a plurality of indentations (serration) which are disposed on the fifth fitting section 32c1 and the sixth fitting section 33a2 are fitted together. The third washer 33a may be fixed on the second pole member 31 at a position of the round hole 33a4 of the third fastening member 33. When the third washer 33a is fixed on the second pole member 31 via the round hole 33a4 by using the bolt 33b and the nut 33c, the pole connecting member 32 can be fixed on the second pole member 31 with any inclination and height.

According to fixing by using the above-mentioned fitting, displacement due to loosening of the bolt 33b is reduced compared with fixing by using a friction force of the conventional bolt and nut. Further, with this fitting configuration, the position can be fixed by an operator lightly tightening the bolt 33b and the nut 33c with his/her hand. This improves construction efficiency.

In this embodiment, for example, as shown in FIG. 14, even if the first foundation 21a is obliquely inclined relative to the installation surface P due to uneven settlement, the inclination of the pole member 22 can be corrected by adjusting the fixation position of the third fastening member 33. Further, even if the first foundation 21a is vertically settled relative to the installation surface P, the height of the pole member 22 can be adjusted. This allows the pole member 22 to be easily held in the substantially vertical direction. Accordingly, when the plurality of pole members 22 is installed, a problem in construction due to varying height or inclination of the pole members 22 can be reduced, thereby improving the construction efficiency.

Although the pole connecting member 32 is fixed on the second pole member 31 in this embodiment, the pole connecting member 32 may be fixed on the first pole member 22. In this case, the pole connecting member 32 includes the side plates 32b to cover a portion of the first pole member 22. As described above, the height of the first pole member 22 can be adjusted by using the elongate hole 32c (third elongate hole), the fifth fitting section 32c1 formed on the inner peripheral surface of the straight portion of the elongate hole 32c, the third fastening member 33 and the like. In this case, the pole connecting member 32 also performs a function as the pole supporting member 29. Alternatively, the pole connecting member 32 may include the side plate 32b that covers a portion of both the first pole member 22 and the second pole member 31 so that each height of the first pole member 22 and the second pole member 31 can be adjusted.

The present invention is not limited to the above described embodiments. Although the first to sixth fitting sections of the third to fifth embodiments are described as the form of serration configuration of the indentation shape, a fitting configuration, for example, having holes and protrusion may be used.

Figure 15:
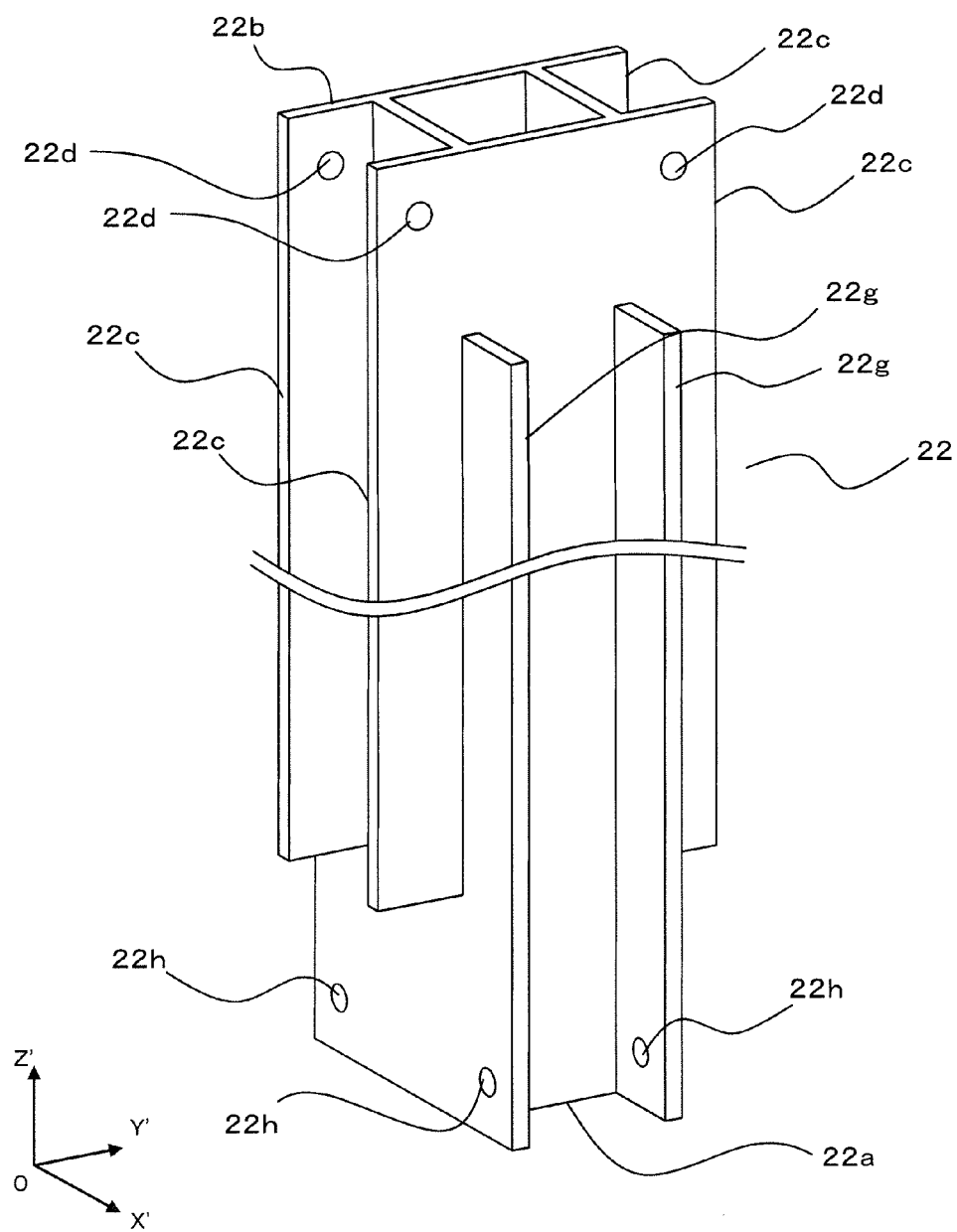
FIG. 15 is a view which shows the photovoltaic system according to another embodiment of the present invention, and is a perspective view which shows another embodiment of a pole member.

Further, the pole member 22 may have a substantially grid-shaped cross section which includes the first flanges 22c and second flanges 22g as shown in FIG. 15. In this case, a portion of the first flange 22c is notched on the lower end section 22a of the pole member 22. Further, a portion of the second flange 22g may be notched on the upper end section 22b of the pole member 22. This improves rigidity of the pole member 22. This shape may also be applied to the above described first pole member 22 and the second pole member 31.

Further, the connecting support member 25 for adjusting the inclination in the Y'-Z' plane direction as shown in the third embodiment and the pole supporting member 29 for adjusting the inclination in the X'-Z' plane direction as shown in the fourth embodiment may be combined. With this configuration, the angle or height of the pole member 22 may be easily adjusted even if the first foundation 21a is settled with various angles due to uneven settlement. This improves construction efficiency.

REFERENCE SIGN LIST 1 photovoltaic system
2 photovoltaic cell module
3 stand
11 translucent substrate
12 photovoltaic cell element
13 filler
14 backside protective member
15 photovoltaic cell panel
15a light receiving surface
15b non-light receiving surface
16 frame
21 foundation
21a first foundation
21b second foundation
22 pole member
22a lower end section
22b upper end section
22c first flange
22d first hole 22e inner wall
22f outer peripheral surface
22g second flange
22h second hole
23 rail member
23a lower surface
23b recess
24 traverse rail member
24a fixing member
25 connecting support member
25a plate section
25b hole
25c protrusion
25d upper surface
25e hole
25f projection
25g first serration section
25h hole
25i elongate hole (first elongate hole)
26 fixing member
26a hole
27 first fastening member
27a first washer
27b second serration section
27c bolt
27d nut
28 fourth fastening member
29 pole supporting member
29a wall section
29b third serration section
29c elongate hole (second elongate hole)
29d bottom section
30 second fastening member
30a second washer
30b fourth serration section
30c bolt
30d nut
31 second pole member
32 pole connecting member
32a upper plate
32b side plate
32c elongate hole (third elongate hole)
32c1 fifth fitting section (fifth serration section)
33 third fastening member
33a third washer
33a1 main surface
33a2 sixth fitting section (sixth serration section)
33a3 stopper section
33a4 round hole
33b bolt
33c nut
33d square washer
34 anchor bolt
P installation surface
Q uneven settlement

The invention claimed is:

1. A photovoltaic system comprising:
a pole member;
a pole supporting member connected to the pole member;
a fastening member that fixes the pole member on the pole supporting member;
a connecting support member disposed on an upper end section of the pole member;
a rail member supported by the connecting support member; and
a photovoltaic cell module disposed on the rail member, wherein
the pole supporting member includes a bottom section, a wall section that is connected to the bottom section and covers at least a portion of an outer peripheral surface of the pole member, two elongate holes which extend in the longitudinal direction of the pole member on the wall section, and a fitting section that is provided on a back side of a surface of the wall section which faces the outer peripheral surface of the pole member or on an inner peripheral surface of the elongate holes,
the two elongate holes are separately located in a direction perpendicular to the longitudinal direction of the two elongate holes, and
the fastening member includes a contact surface that is in contact with the fitting section, the contact surface being provided with a section to be fitted that fits with the fitting section, located in the two elongate holes and two holes disposed on the pole member respectively to fix the pole member on the pole supporting member.

2. The photovoltaic system according to claim 1, wherein the connecting support member includes a lower section that covers at least a portion of an outer peripheral surface of the upper end section of the pole member, the lower section of the connecting support member includes two opposite plate sections, and at least a portion of the outer peripheral surface of the upper end section of the pole member is located between the opposite plate sections.

3. The photovoltaic system according to claim 2, wherein the two plate sections include a protrusion which protrudes from an inner surface of at least one of the plate sections so that a lower surface of the protrusion is in contact with the upper end section of the pole member.

4. The photovoltaic system according to claim 1, wherein the pole member includes a tubular section in the longitudinal direction.

5. The photovoltaic system according to claim 1, wherein a cross sectional shape of the pole member in a cross section perpendicular to the longitudinal direction of the pole member is I-shape, T-shape or H-shape.

6. The photovoltaic system according to claim 1, wherein the connecting support member includes an upper surface section and a projection or a recess formed at the upper surface section, and the rail member includes a lower surface section and a recess that corresponds to the projection or a projection that corresponds to the recess of the connecting support member.

7. The photovoltaic system according to claim 2, further comprising another fastening member that fixes the connecting support member on the pole member, wherein the another fastening member is inserted into another elongate hole which extends in the longitudinal direction of the pole member on at least one of the two plate sections and another hole disposed on the upper end section of the pole member to fix the connecting support member on the pole member.

8. The photovoltaic system according to claim 7, wherein the plate section includes a first fitting section on a back side of a surface which faces the outer peripheral surface of the pole member, and the first fastening member includes a contact surface that is in contact with the first fitting section, the contact surface being provided with a second fitting section that fits with the first fitting section.

9. The photovoltaic system according to claim 8, wherein the first fitting section is a first serration section, and the second fitting section is a second serration section that is capable of fitting with the first serration section at a plurality of positions in the longitudinal direction of the pole member.

10. The photovoltaic system according to claim 1, wherein the fitting section is a serration section, and the section to be fitted is another serration section that is capable of fitting with the serration section at a plurality of positions in the longitudinal direction of the pole member.

* * * * *